United States Patent [19]

Trudeau

[11] 4,048,704
[45] Sept. 20, 1977

[54] METHOD FOR REBUILDING PINSETTER PULLEY ASSEMBLIES

[76] Inventor: Albert R. Trudeau, 545 Meadowdale, Ferndale, Mich. 48220

[21] Appl. No.: 695,067

[22] Filed: June 11, 1976

[51] Int. Cl.² .............................................. B23P 7/00
[52] U.S. Cl. .............................. 29/401 R; 29/159 R; 29/401 F; 29/402
[58] Field of Search ............ 29/159 R, 401 R, 401 F, 29/402, 148.5 R, 401 E

[56] References Cited

U.S. PATENT DOCUMENTS

| | | | |
|---|---|---|---|
| 1,559,901 | 11/1925 | Mattice | 29/402 |
| 2,185,483 | 1/1940 | Ward | 29/149.5 R X |
| 2,415,324 | 2/1947 | Wilson | 29/149.5 R |
| 2,594,810 | 4/1952 | Schaub et al. | 29/401 |
| 3,006,064 | 10/1961 | Watson | 29/401 |
| 3,297,147 | 1/1967 | Sackett, Sr. | 29/159 R X |
| 3,728,776 | 4/1973 | Defazio | 29/401 |

*Primary Examiner*—Victor A. DiPalma
*Attorney, Agent, or Firm*—Dolgorukov & Dolgorukov

[57] ABSTRACT

The specification discloses a novel method for rebuilding pinsetter pulley assemblies of the type having a compound contoured pulley face and a ball bearing at each end of the pulley for support. Depending on whether the outer surface is worn, or one or both of the bushing bores is worn, the method involves cutting a taper on the outer surface in a suitable manner and/or reboring one or both bushing bores and inserting a bushing sleeve and new bushing therein.

17 Claims, 10 Drawing Figures

METHOD FOR REBUILDING PINSETTER PULLEY ASSEMBLIES

My invention relates to a method for rebuilding bowling pinsetter pulley assemblies of the type supported for rotation by a ball bearing in each end thereof and having a compound contoured pulley face. The typical pulley of this type has an outer surface having a convex portion occupying much of the surface of the pulley upon which a wide belt will ride, and a narrow flat portion upon which a much smaller belt will ride. In use, it has been found that wear conditions come about which in the past have made the pulley assembly completely unsuitable for use, resulting in the necessity of discarding the same at great expense.

The first wear condition involves the rippling of the large convex pulley surface by the wide pinsetter belt, with very pronounced grooves appearing in the pulley proximate the edges of said belt. When these grooves become pronounced, there is no surface left to grip the belt, and it slips off the pulley assembly, causing the disabling of the pinsetter. Since prior to this time there has been no known method of rebuilding the surface of the pulley successfully, it had to be discarded at relatively great expense, and a new pulley installed to place the pinsetter back in service.

I have also found in my many years of repairing pinsetting machines that a second condition can occur. If the pulley assemblies are not perfectly balanced, the normal vibration inherent in the pinsetting machine can cause the pulley assembly to vibrate excessively, battering one or both of the bearing bores of the pulley assembly, resulting in excessive vibration of the pulley assembly during operation, and a subsequent disabing of the pinsetting machine, even though the pulley surface is still in serviceable condition.

While I am not aware of any solutions which have been tried before to solve the bearing problem, I am aware of two solutions which have been attempted to rebuild the surfaces of the pulley to extend the life of the pulley assembly. The first of these solutions involved simply making the pulley flat across its entire face by the use of a metal working lathe, or other suitable machine. However, this has proved unsatisfactory because it has resulted in a complete lack of necessary gripping surface for the wide pinsetter belt, causing it to slip off the pulley, and resulting in much down time for the pinsetter machines.

The second solution which has been attempted is to cut deep grooves in the pulley face where the natural wearing of the pulley takes place in the hope that this would cause the edges of the belt to be retained in the groove, thus, providing the necessary gripping surface and extending the life of the pulley. However, while the gripping surface has been provided, it has been found that the edges of the belt have become excessively frayed, resulting in substantial shortening of the belt life, which again results in the disabling of the pinsetter for excessive lengths of time. Accordingly, one of the objects of the present invention is to provide an improved method of rebuilding pinsetter pulley assemblies which eliminates the above problem and is relatively inexpensive to perform.

Another object of the present invention is to provide a method of the foregoing nature which can easily be performed on standard machines such as a lathe with a boring attachment.

A further object of the present invention is to provide a method of rebuilding pinsetter pulley assemblies wherein the rebuilt pulley is provided with a new tapered surface on which the wide pinsetter belt rides, and which provides a sufficient grip on the belt so that the belt will not slide off the rebuilt surface.

A still further object of the present invention is to provide a method of rebuilding the bearing retaining surfaces of one or both ends of the pulley assembly.

A still further object is to provide for the rebuilding of the bearing bores by enlarging the bores and press fitting a bushing in the bore, into which the old bearing or a new bearing may be placed.

Another object of the present invention is to provide a heat resistant enamel coating for the rebuilt face of the pulley to provide additional strength thereto, and provide a better gripping surface.

Further objects and advantages of this invention will be apparent from the following description, reference being had to the accompanying drawings forming a part of the specification, wherein like reference characters designate corresponding parts in the several views.

It is to be understood that the invention is not limited in its applicaton to the details of construction and arrangement of parts illustrated, since the invention is capable of other embodiments and of being practiced and carried out in various ways within the scope of the claims. Also, it is to be understood that the phraseology and terminology employed herein is for the purpose of description and not of limitation.

Figure 1:
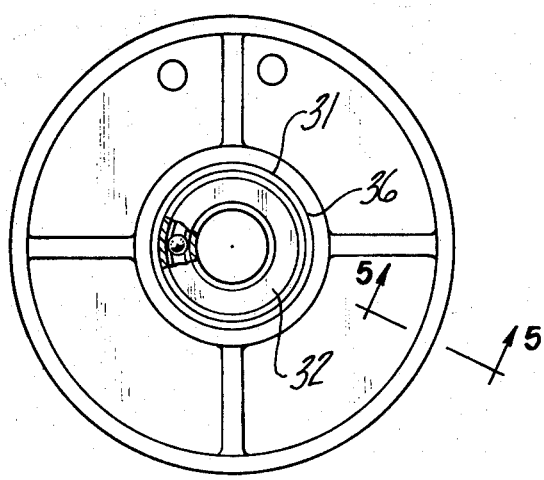
FIG. 1, is an elevational view of a pulley after rebuilding using the method of the present invention.
Figure 2:
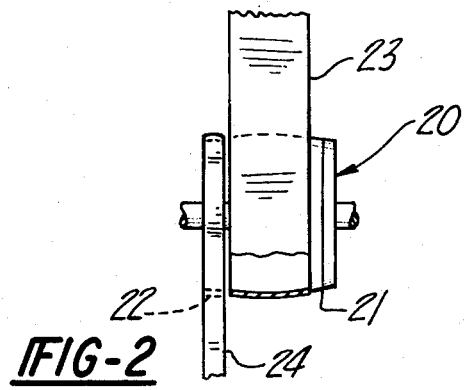
FIG. 2, is a plan view of a new pulley assembly in use.
Figure 2A:
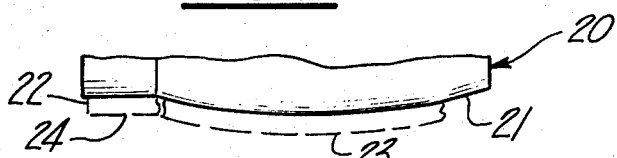
FIG. 2A, is a fragmentary edge view of the pulley of FIG. 2 showing a rounded contour surface in combination with a flat surface, which is typical of the pulleys commonly used in pinsetters.
Figure 3:
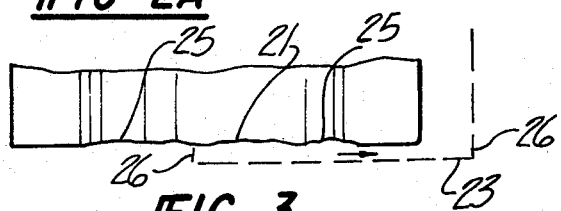
FIG. 3, is a fragmentary edge view of a pulley assembly showing the rippling effects left in the surface by the pulley belt after extended use.
Figure 6:
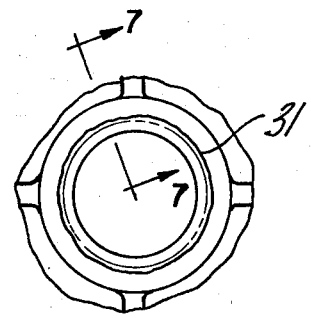
FIG. 6, is a fragmentary elevational view showing a pulley having an enlarged and worn out bearing bore due to excessive vibration.
Figure 4:
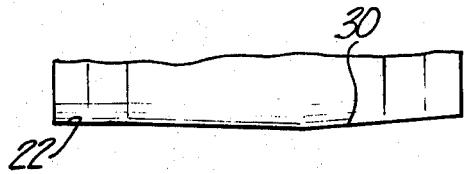
FIG. 4, is a fragmentary edge view of the pulley assembly of FIG. 3 after the cutting away of the rippled surface with a form tool.
Figure 7:
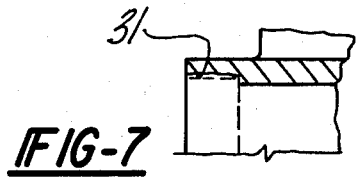
FIG. 7, is a sectional view taken in the direction of the arrows on the section line 7-7 of FIG. 6 showing the enlarged bearing bore.
Figure 5:
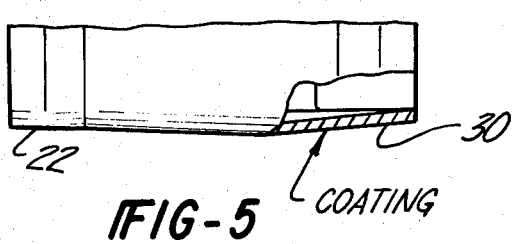
FIG. 5, is a fragmentary end view, partially in section, showing the enamel coating that has been applied to the recut pulley surface to give additional strength.
Figure 8:
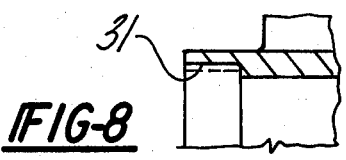
FIG. 8, shows the pulley assembly of FIG. 7 after the bearing bore has been refinished.
Figure 9:
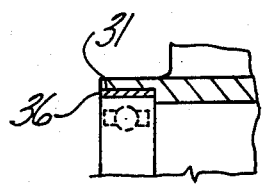
FIG. 9, shows the pulley assembly of FIG. 8 after a bearing bushing and a new bearing have been installed according to the method of the present invention.

The pulley assembly which it is the object of the present invention to rebuild is shown in its new condition in FIGS. 2 and 2A. The pulley itself is generally designated by the numeral 20 and has a compound face surface consisting of a convex portion 21 and a flat portion 22 on which a relatively large belt 23 and a much smaller belt 24 ride respectively. In normal operation the large belt 23 tends to ripple the surface 21, and in time wears very pronounced grooves 25 into the pulley face, causing the belt 23 to lose its grip on the pulley 20 and slide off the pulley as shown in FIG. 3. As previously mentioned, several solutions to this problem were tried. The first being to cut off the convex portion 21 so that this portion of the pulley face would match the flat portion 22. This however, resulted in the belt having no surface whatsoever to grip, and repeatedly slipping off the pulley.

The second solution involved the enlarging of the natural grooves 25 in hope that the edge portion 26 of the belt 28 would ride in the grooves, and thus extend the life of the pulley assembly at little or no cost. However, it was soon found that the edges 26 riding in the enlarged grooves wore at an excessive rate, and thus this also proved to be an unsuccessful solution to the problem. Thus, in my solution to the problem, I rejected any method which would result in such drastic alteration of the pulley face and instead concentrated on a method which would return said pulley face to as near its original condition as possible consistent with a simple method of rebuilding. I have found through experience that providing a tapered surface 30 on the pulley adjacent the flat portion 22 gives satisfactory results with a minimum of expense.

In performing the actual rebuilding according to the method of the present invention, the pulley is first inspected to determine whether just the pulley face consisting of the convex and flat portions 21 and 22 are the only portion worn, or in addition, do one or both of the bearing bores 31 need recutting. If the bearing bores are in satisfactory condition, the pulley assembly 20 has bearings 32 removed and standard arbors well known in the art are used to chuck the pulley assembly in a lathe, with a standard lathe dog used to secure the mounted assembly for rotation.

At this point, several methods of providing the tapered surface could be used, all of which are known in the art and need not be explained in too great a detail. One of the methods known to me is to use a form tool which is advanced toward the work until a desired depth or cut is reached. Such depth of cut can be determined in advance by the use of a standard indicator, or the tool may be advanced in steps such as 0.010 inch, until the last visual trace of the rippled surface 21 is eliminated. The form tool should cut a new flat surface 22 at the same time. By experience, I have found that as much as 0.090inch of metal may have to be removed to provide a full tapered surface 30. In some cases, it may not be desirable to remove such a great amount of metal due to the possibility of weakening the pulley assembly. This situation usually occurs where the pulley is very badly worn, and in these cases, the face of the pulley may be built up by a suitable welding technique, such as the Heliarc process, before the taper is cut.

I have also found that the bearing bore may be cracked, and in this case, a welding process may be used to repair the bore before machining.

Alternately, the tapered surface can be provided without the use of the form tool, by using a standard lathe tool in combination with a template in a manner well knwon in the art. Other methods of providing the tapered surface can be found in many publications in the metalworking field. For the purpose of disclosure, I wish to note that an excellent source for this information is the Shop Theory Manual published by the Henry Ford Trade School (now the Henry Ford Community College) in Dearborn, Michigan.

If inspection of the pulley shows that in addition to the pulley face, one of the bearing bores 31 is worn, the method is performed in a similar way. The pulley assembly would be chucked in the lathe and would be properly located therein by indicating the good bearing bore and the pulley face to ensure that the two coincide. A small amount of metal would then be removed from a portion of the pulley face to provide a suitable locating surface, after which the pulley assembly would be rechucked from the locating surface, and the worn bearing bore would be refinished. The assembly would then be mounted between two arbors as previously described, and the outer surface would then be recut.

If the outer surface of the pulley is good, and only one bearing bore is worn, the assembly would simply be chucked in the lathe, an indicator would be used to locate it accurately, and the worn bearing bore would be recut.

If both bearing bores are bad, this will necessitate reversing the process and chucking the pulley from the pulley face, after an indicator is used to locate an unworn or "good" portion of the pulley face, and reboring both bearing bores first, and then using, if necessary, the new bearing bores to locate the pulley assembly 20 on the arbors 33 as previously discussed, to turn the face of the pulley.

It should be understood at this point that the turning of the pulley face, and the reboring of the bearing bores can be performed by other machines well known in the art, and it is well within the scope of the claims in the present application that these operations be performed in any suitable way, for example, on a boring machine.

Referring to FIGS. 6-9, once the bearing bore is refinished, a new bearing bushing 36 is press fit into the refinished bearing bore 31. The size of the refinished bearing bore and of the bearing bushing are chosen depending on the amount of wear of the bearing bore and the size of the new bearing to be inserted. In order for the method of my invention to be successful, it is only necessary that there be a press fit between the bushing 36 and the bore 31, and between the bearing 32 and the bushing 36. Any desired combination of sizes can be used as long as the particular combination chosen does not unduly weaken the pulley assembly. This is true whether one or both of the bearing bores is to be refinished.

In order to complete the rebuilding process, if the resurfacing of the pulley face has been involved, since I have found that the newly exposed tapered face will wear rapidly unless it is strengthened in some manner, I provide this additional strength by applying a heat resistant enamel coating to the pulley face. This coating can be sprayed or brushed on as long as a minimum thickness of 0.002inch is maintained. A coating thickness less than this results in low durability, while a coating thickness too much greater than this results in flaking of the painted surface. For even greater strength, one of the epoxy based heat resistant enamels may be used, in which case the additional step of curing the enamel itself is performed. Regardless of which type of enamel is used, a much increased durability and improved gripping of the pinsetter belt will result.

Thus, by abandoning work along lines of the previously attempted solutions to this problem, which drastically altered the pulley face by completely removing the convex portion thereof, or cutting deep grooves therein, and instead concentrating mainly on a method which involves very little alteration of the pulley face, I have solved a long standing problem in the art, and have achieved the objects listed above, and numerous additional advantages.

I claim:

1. A method of rebuilding pinsetter pulley assemblies of the type having a compound pulley face consisting of a convex surface and a flat surface, and having a worn convex surface only, said method including the steps of removing said worn convex surface, machining a new tapered surface in place of said convex surface, applying a heat resistant enamel coating to said tapered surface and curing said coating.

2. The method defined in clam 1, wherein the providing of said tapered surface includes the steps of mounting said pulley assembly in a suitable machine, determining the depth of cut needed to eliminate the last trace of wear in said convex surface and providing a complete taper thereon, and removing metal from said pulley face until the desired depth of cut is reached.

3. The method defined in claim 2, wherein said suitable machine is lathe.

4. The method defined in claim 2, wherein said suitable machine is a boring machine.

5. The method defined in claim 2, wherein said heat resistant enamel coating is applied to a minimum depth of 0.002inch.

6. The method defined in claim 5, wherein the face of said pulley assembly is excessively worn and the convex portion of the pulley face thereof is built up by a welding process before said taper is cut.

7. A method of rebuilding pinsetter pulley assemblies of the type having a compound pulley face consisting of a convex portion and a flat portion and having a worn bearing bore in addition to a worn pulley face, and including the steps of locating the pulley assembly for the reboring operation from a good portion of the pulley face by the use of an indicator, removing a small amount of metal from said pulley face, rechucking said pulley assembly from said recut portion, reboring said bearing bore, locating said pulley assembly from said bearing bores, performing the steps set forth in claim 1, press fitting a new bearing bushing into said refinished bore, and press fitting the old or a new bearing into said bearing bushing.

8. The method defined in claim 7, wherein said heat resistant enamel coating is applied to a minimum depth of 0.002inch.

9. The method defined in claim 8, wherein the face of said pulley assembly is excessively worn and the convex portion thereof is built up by a welding process before said taper is cut.

10. The method defined in claim 8, wherein said bearing bore is excessively damaged or cracked and is repaired by the use of a welding process bofore it is rebored.

11. A method of rebuilding pinsetter pulley assemblies of the type having a compound pulley face and wherein said pulley assembly is supported for rotation on ball bearings with said pulley assembly only having one of two bearing bores worn, said method including the steps of locating said pulley assembly for reboring of said worn bearing bore from said pulley face, refinishing said worn bore to a larger predetermined diameter, inserting by way of a press fit a bearing bushing of a desired size, and reinserting said old bearing or a new bearing into said bearing bushing, thereby accomplishing the rebuilding of said pulley assembly.

12. The method defined in claim 11, wherein said pulley assembly has two worn bearing bores only, and still has a serviceable pulley face, the rebuilding of said pulley assembly including the steps of reboring both bearing bores after locating the pulley assembly from the pulley face thereof, refinishing both bearing bores to a larger predetermined size, press fitting new bearing bushings in both of said refinished bores, and press fitting new or used bushings into both bearing bushings, thereby accomplishing the rebuilding of said pulley assembly.

13. A method rebuilding pinsetter pulley assemblies of the type having a compound pulley face consisting of a convex and a flat surface and being supported for rotation by ball bearings on either end of said pulley assembly, with said pulley assembly having a worn out pulley face and both bearing bores in need of rebuilding, the method of rebuilding said pulley assembly including the steps of claim 12, and further including the steps of providing a new tapered surface in place of said convex surface by mounting said pulley assembly in a suitable machine, determining the depth of cut needed to provide a complete tapered surface in place of said convex surface, and removing said metal from the pulley face until the desired depth of cut is reached.

14. The method defined in claim 13, and including the steps of applying a heat resistant enamel coating to said tapered surface and curing said coating.

15. The method defined in claim 14, wherein said heat resistant enamel coating is applied to a minimum depth of 0.002inch.

16. The method defined in claim 15, wherein the face of said pulley assembly is excessively worn and the convex portion of the pulley face thereof is built up by a welding process before said taper is cut.

17. The method defined in claim 15, wherein said bearing bore is excessively damaged or cracked and is repaired by the use of a welding process before it is rebored.

* * * * *